United States Patent
Chen et al.

(10) Patent No.: US 8,212,931 B2
(45) Date of Patent: Jul. 3, 2012

(54) IMAGE PROCESSING AND CONTROLLING SYSTEM

(75) Inventors: Cheng-Hsien Chen, Chiayi (TW);
Zong-Ying Chung, Kaohsiung (TW);
Bao-Jen Pong, Taoyuan County (TW);
Shau-Wei Hsu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 1019 days.

(21) Appl. No.: 12/174,701

(22) Filed: Jul. 17, 2008

(65) Prior Publication Data
US 2009/0167950 A1 Jul. 2, 2009

(30) Foreign Application Priority Data
Dec. 27, 2007 (TW) .................... 96150489 A

(51) Int. Cl.
*H04N 11/00* (2006.01)
*G09G 5/00* (2006.01)
*H04N 5/44* (2011.01)
*H04N 5/58* (2006.01)

(52) U.S. Cl. .................. 348/602; 348/227.1; 348/658; 345/207

(58) Field of Classification Search .......... 345/102, 345/207, 214, 104, 170, 581; 348/184, 185, 348/223.1, 631, 102, 602, 227.1, 603, 657, 348/658; 315/382.1
See application file for complete search history.

(56) References Cited

U.S. PATENT DOCUMENTS

| | | | |
|---|---|---|---|
| 4,090,216 A * | 5/1978 | Constable | 348/602 |
| 5,550,575 A | 8/1996 | West et al. | |
| 5,583,560 A | 12/1996 | Florin et al. | |
| 5,977,964 A * | 11/1999 | Williams et al. | 715/721 |
| 6,618,045 B1 * | 9/2003 | Lin | 345/207 |
| 6,952,195 B2 | 10/2005 | Arakawa | |
| 7,142,218 B2 * | 11/2006 | Yoshida et al. | 345/589 |
| 7,221,374 B2 * | 5/2007 | Dixon | 345/591 |
| 7,545,397 B2 * | 6/2009 | O'Dea et al. | 345/694 |
| 7,616,262 B2 * | 11/2009 | Eves et al. | 348/553 |
| 7,969,478 B1 * | 6/2011 | Chen et al. | 348/223.1 |
| 8,026,908 B2 * | 9/2011 | Ku et al. | 345/207 |
| 8,049,789 B2 * | 11/2011 | Innocent | 348/223.1 |
| 2006/0007223 A1 * | 1/2006 | Parker | 345/207 |
| 2006/0058925 A1 | 3/2006 | Diederiks et al. | |
| 2007/0126727 A1 * | 6/2007 | Chiang | 345/207 |
| 2009/0086473 A1 * | 4/2009 | Tan et al. | 362/229 |
| 2009/0146982 A1 * | 6/2009 | Thielman et al. | 345/207 |
| 2009/0219305 A1 * | 9/2009 | Diederiks et al. | 345/690 |

OTHER PUBLICATIONS

Taiwan OA issued on Nov. 8, 2011.

* cited by examiner

*Primary Examiner* — Pankaj Kumar
*Assistant Examiner* — Reuben M Brown
(74) *Attorney, Agent, or Firm* — WPAT., P.C.; Justin King

(57) ABSTRACT

An image processing and controlling system is provided in the present invention. In addition to adjusting the image displaying modes according to the ergonomic look-up table, the present invention is further capable of adjusting the weighting value with respect to each image characteristic value of an initial image according to lighting characteristics of an ambient light system such that a display unit can provide the most comfortable viewing conditions and the best image quality under different ambient lighting characteristics. In another embodiment, the present invention further functions to control the ambient light system according to the image characteristics of the weighted output image. By means of the foregoing dual controlling ways, the image processing and controlling system may provide appropriate output images corresponding to different viewing scenario and conforming to the requirement of output quality.

14 Claims, 10 Drawing Sheets

IMAGE PROCESSING AND CONTROLLING SYSTEM

FIELD OF THE INVENTION

The present invention relates to an image processing technique, and more particularly, to an image processing and controlling system capable of adjusting its output image quality according to lighting characteristics of its ambient light and ergonomic human factors.

BACKGROUND OF THE INVENTION

Facing the worldwide development trend of stronger-than-expected demand of the LCD industry, it is estimated that there are already 42.7 million LCD televisions being sold in 2006 and the totality of LCD TVs sold is going to exceed the benchmark amount of 100 million in 2010. However, as it is foreseeable that consumer demand will continue to rise as prices fall, LCD TV makers are going to face fierce competition in global market but with less profit. Thus, except for upgrading its LCD panel specifications and perfecting its manufacture technique, all the LCD TV makers are trying to provide appealing designed TV sets with high image quality that not only meets the needs of different customer segments, but also is distinct from others by its unique taste and brand name.

Starting from 2005, Japan's panel manufacturers began their global effort for promoting high definition televisions (HDTVs) that brought up another trend of ever increasing demand for the HDTVs. Nowadays, under the effect of the revolutionary development in LED lighting, people is no longer satisfied by having a HDTV only capable of providing high quality images, but it should be able to provide the most comfortable viewing conditions with best image quality under different ambient lighting characteristics. Conventionally, LCD TVs are only designed with the function enabling them to control their display unit's brightness and contrast according to the ambient brightness of their viewing environment, but only a few of them is able to adjust their display unit in response to the color of ambient lighting. However, there is almost no LCD TV that will take human factor into its image quality design consideration.

In U.S. Pat. No. 7,142,218, entitled "Image display device and electronic apparatus using same, and image display method of same", an image display device and method are provided which are capable of using a sensor to detect ambient light characteristics of external light while feeding the detected ambient light characteristics along with inputted image signals to a chrominance signal converter where they are processed for setting a color to display as an image agreeable with chromatic adaptation characteristics of human. In U.S. Pat. No. 6,952,195, entitled "Image display device", an image display device is provided which is capable of allowing the backlight of a liquid crystal display device to be bright when ambient light is bright and allowing the backlight to be dark when the ambient light is dark such that the image display device enables displayed images to be really discernible regardless of brightness of ambient light. Moreover, in U.S. Pub. No. 20060058925, entitled "Method of and system for controlling an ambient light and lighting unit", a method and system of controlling an ambient light are provided which is able to adapt the lighting surrounding a presentation device according to the progress of the media content playing on the same so as to enhance the viewer's visual satisfaction and enjoyment. The foregoing ambient light control system can divide a signal inputted thereto into a main data and an additional data while sending the main data to its display unit for playing and setting a property of the ambient light based upon the additional data for coordinating the changing of the ambient light with the scenario playing on the display unit.

SUMMARY OF THE INVENTION

The object of the present invention is to provide an image processing and controlling system, capable of adjusting the weighting value with respect to each image characteristic value of an initial image according to lighting characteristics of an ambient light system for enabling a display unit to provide the most comfortable viewing conditions and the best image quality under different ambient lighting characteristics.

Another object of the invention is to provide an image processing and controlling system, capable of adjusting the image characteristics of an output image while functioning to control the ambient light system according to feedback of the adjusted image characteristics, and thereby, enabling lighting of the ambient light system to coordinate with the scenario described in the output image by a dual controlling manner.

In an exemplary embodiment of the invention, the present invention provides an image processing and controlling system, comprising: a lighting mode module, capable of detecting lighting characteristics of an ambient light system for generating a lighting signal accordingly; an image processor, for receiving and processing an initial image signal and being further comprised of: a human-factor processing unit, electrically connected to the lighting mode module for enabling the same to base upon an image characteristic of the initial image signal and the lighting signal for obtaining a weighting value to be used for calibrating the image characteristic and thus obtaining a calibrated image characteristic; and a quality control unit, electrically connected to the human-factor processing unit for enabling the same to output an output image signal according to the calibrated image characteristic; and a display unit, for receiving the output image signal and thus displaying the same.

In another exemplary embodiment, the present invention provides an image processing and controlling system, comprising: a lighting mode module, capable of detecting lighting characteristics of an ambient light system for generating a lighting signal accordingly; an image processor, for receiving and processing an initial image signal and being further comprised of: an image mode unit, for pre-setting an output mode for the initial image signal according to an ergonomic human factor; a human-factor processing unit, electrically connected to the image mode unit and the lighting mode module for enabling the same to base upon an image characteristic of the initial image signal and the lighting signal for obtaining a weighting value to be used for calibrating the image characteristic and thus obtaining a calibrated image characteristic; and a quality control unit, electrically connected to the human-factor processing unit for enabling the same to output an output image signal according to the calibrated image characteristic; and a display unit, for receiving the output image signal and thus displaying the same.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

Figure 1:
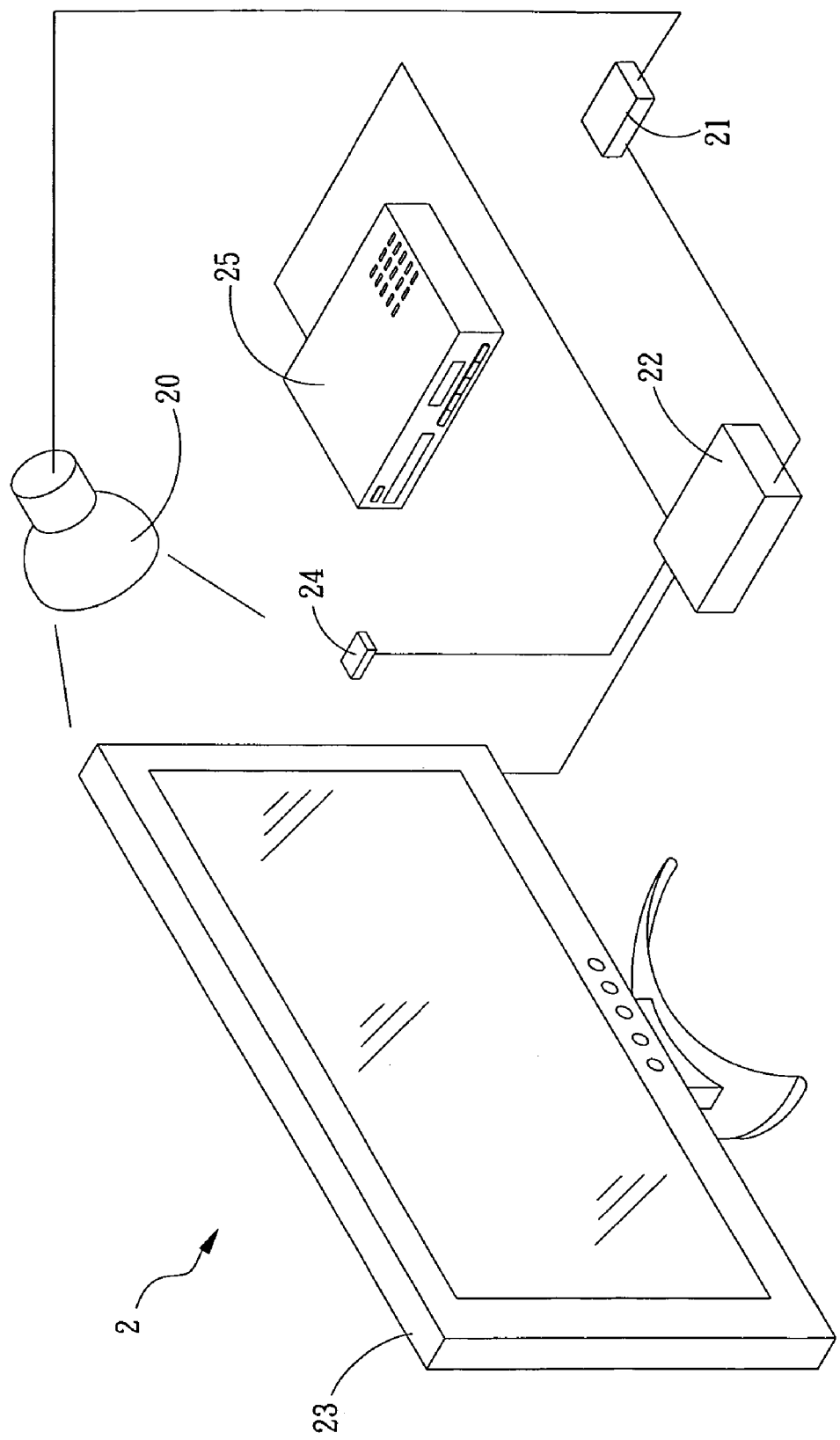
FIG. 1 is a schematic view of an image processing and controlling system according to a first exemplary embodiment of the invention.

For your esteemed members of reviewing committee to further understand and recognize the fulfilled functions and structural characteristics of the invention, several exemplary embodiments cooperating with detailed description are presented as the follows Please refer to FIG. 1, which is a schematic view of an image processing and controlling system according to a first exemplary embodiment of the invention. In this exemplary embodiment, the image processing and controlling system 2 comprises: a lighting mode module 21, and image processor 22 and a display unit 23. The lighting mode module 21 is capable of detecting lighting characteristics of an ambient light system 20 for generating a lighting signal accordingly. It is known that the ambient light system 20 denotes any light source capable of emitting light toward the ambient environment of the display unit 23. The image processor 22 is used for receiving an initial image and then processing the same basing upon its ambient lighting and predefined human factors so as to output a high quality image that matches with scenario requirements and viewer's preferences. It is noted that the image processor 22 can be integrated with the lighting mode module 21 as required or even be integrated with the display unit 23. Moreover, the initial image is generally referred to those provided by commercial program providers, such as cable TV operators, wireless TV stations or satellite TV operators. In addition, the initial image can be acquired from a image player, such as DVD player or VCD player. In this embodiment, the initial image is acquired from an image player 25. The displaying device 23 is used for or receiving the high quality image signal and thus displaying the same Please refer to FIG. 2, which is block diagram of the image processing and controlling system shown in FIG. 1. In FIG. 1, the lighting mode module 21 further comprises: a photo sensor 210 and a color converting unit 211. the photo sensor 210 is capable of detecting a lighting characteristic of the ambient light system 20 for generating a corresponding sensing signal to the color converting unit 211. It is noted that although there is only one photo sensor 210 shown in FIG. 1, there can be more than one photo sensors 210 to be disposed at positions as required for enhancing detection accuracy. The color converting unit 210 is connected to the photo sensor 210 so as to convert the sensing signal into the lighting signal. In this embodiment, the lighting signal represent those optic information relating to the light from the ambient light system 20, such as illuminance, spectrum, colour, color temperature and the other optic information thereof, that it can be a CIE-XYZ signal, a YUV signal or a color signal, but is not limited thereby.

Figure 2:
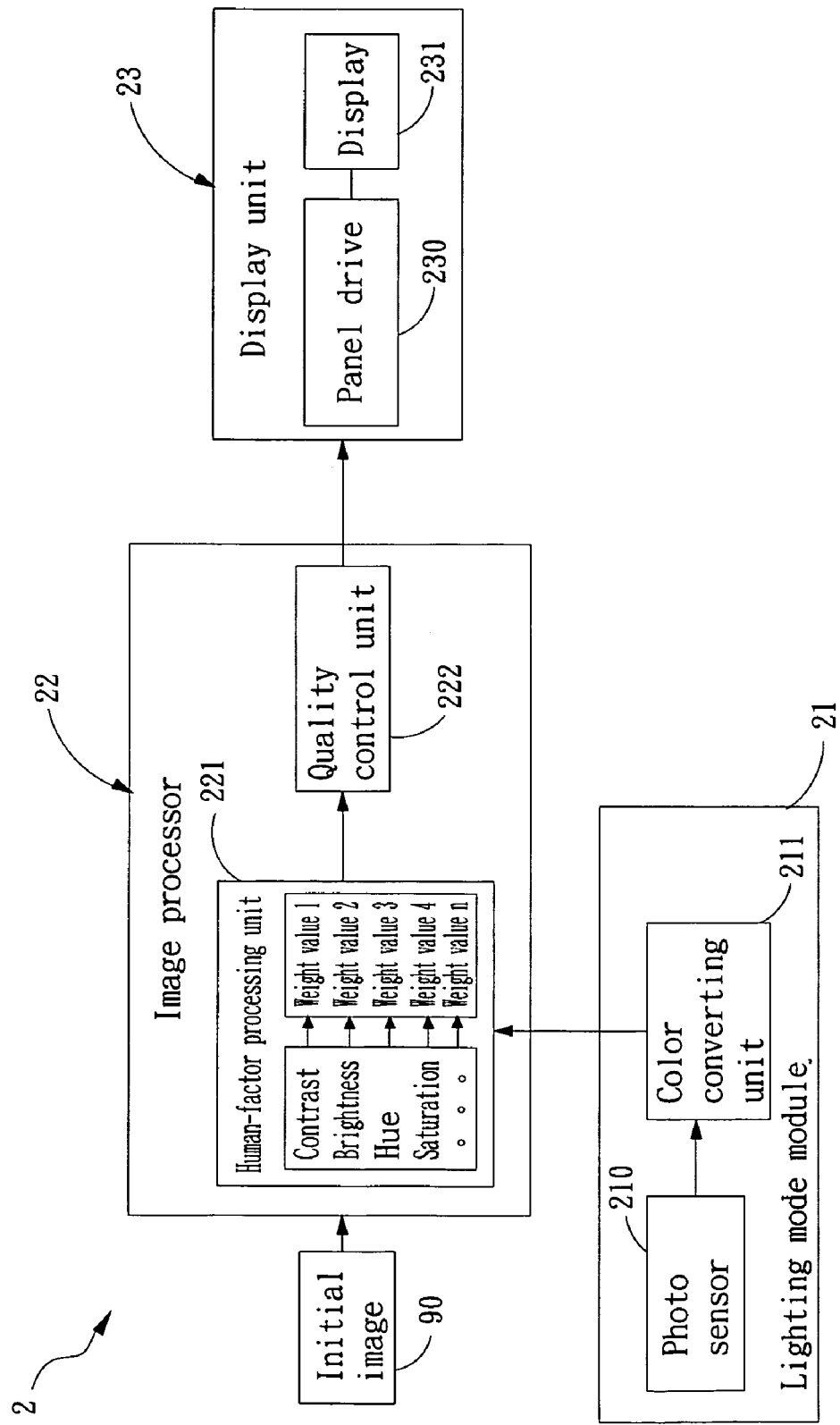
FIG. 2 is block diagram of the image processing and controlling system shown in FIG. 1.

As shown in FIG. 2, the image processor 22 further comprises: a human-factor processing unit 221, and a quality control unit 222. The human-factor processing unit 221 is electrically connected to the lighting mode module 22 for enabling the same to base upon an image characteristic of the initial image signal and the lighting signal for obtaining a weighting value to be used for calibrating the image characteristic and thus obtaining a calibrated image characteristic. The abovementioned image characteristics includes contrast, brightness, hue and saturation, but is not limited thereby. When the initial image is received by the human-factor processing unit 221, it is going to perform an analysis upon the received initial image so as to obtain the image characteristics relating to the initial image, such as information relating to saturation distribution and contrast distribution, and then it is going to come up with a appropriate weighting basing upon the lighting signal. As shown in FIG. 2, after the processing of the human-factor processing unit 221, weighting values for calibrating the image characteristics of contrast, brightness, hue, saturation, etc., are obtained and thus those image characteristics are calibrated.

For instance, when a working mode is selected as viewer's preference, the image characteristics of the initial image corresponding to the working mode will be calibrated by the use of a weighting control, e.g. brightness×1.1, contrast×1.2, saturation×0.8, while the subjecting to weighting control to the calibration basing upon ambient light. The quality control unit 222 is electrically connected to the human-factor processing unit 221 for enabling the same to output an output image signal to the display unit 23 according to the calibrated image characteristics and the lighting signal. In FIG. 2, the display unit 23 comprises a panel drive 230 and a display 231. The panel drive 230 us used for receiving and processing the image signal from the quality control unit 222 while transmitting the result of the processing to the display 231. The display can be a flat panel display, such as a LCD TV or plasma TV. In addition, the display 231 can be a projector that projects images on a screen. It is noted that the abovementioned system of the invention is able to perform the designed feedback control in a repetitive manner, that is, after the image characteristics are calibrated for the first time according to the lighting signal, the calibrated image characteristic is fed back to the ambient light system for adjusting the lighting signal according and thereafter the adjusted lighting signal is further being detected by the photo sensor, and if the image processor decided that the first calibrated image characteristic still can not match with the adjusted lighting signal, it is going to perform the image calibration for the send time, and so forth, until an optimal image quality is achieved.

Figure 3:
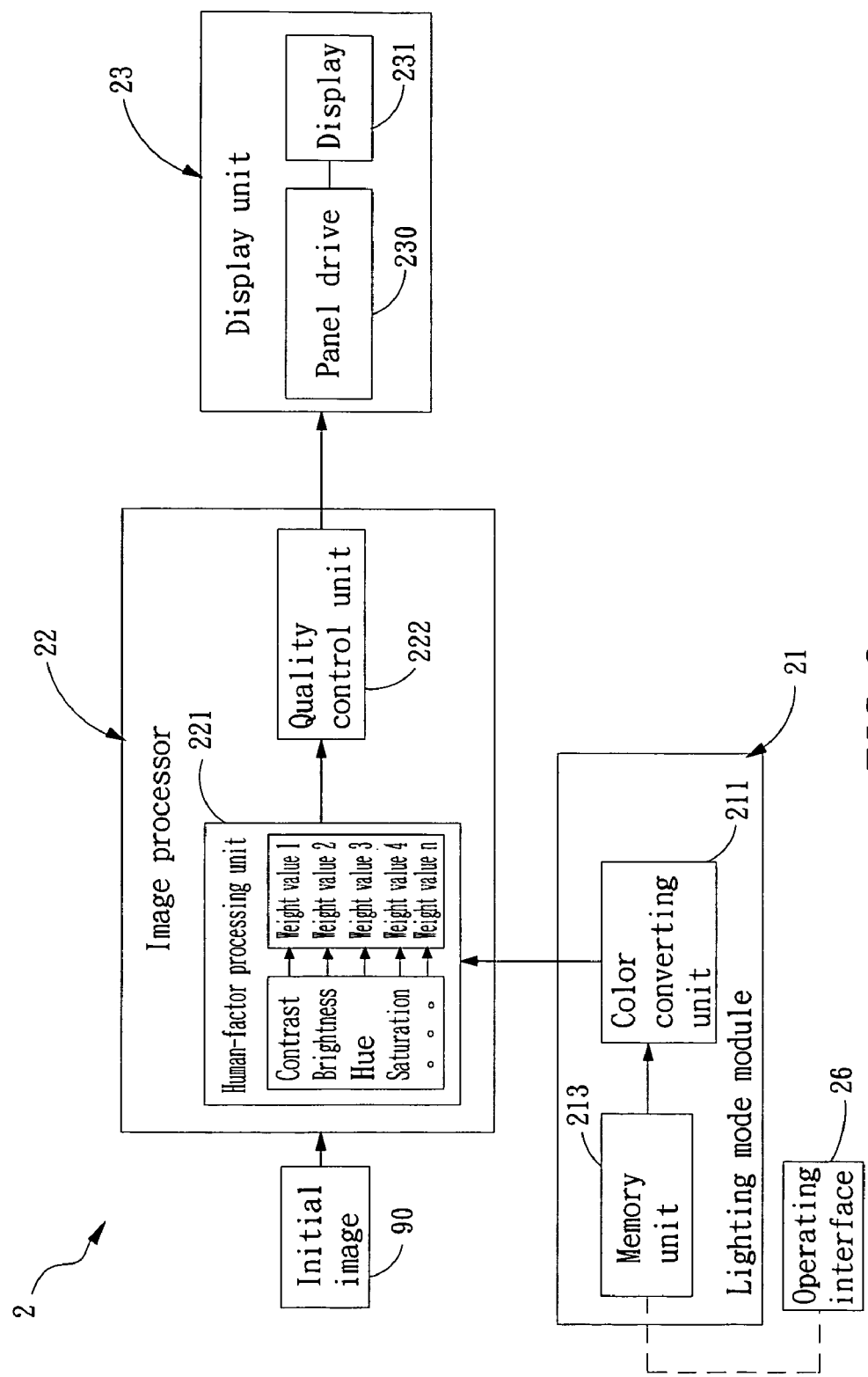
FIG. 3 is a block diagram depicting an image processing and controlling system according to a second exemplary embodiment of the invention.
Figure 4:
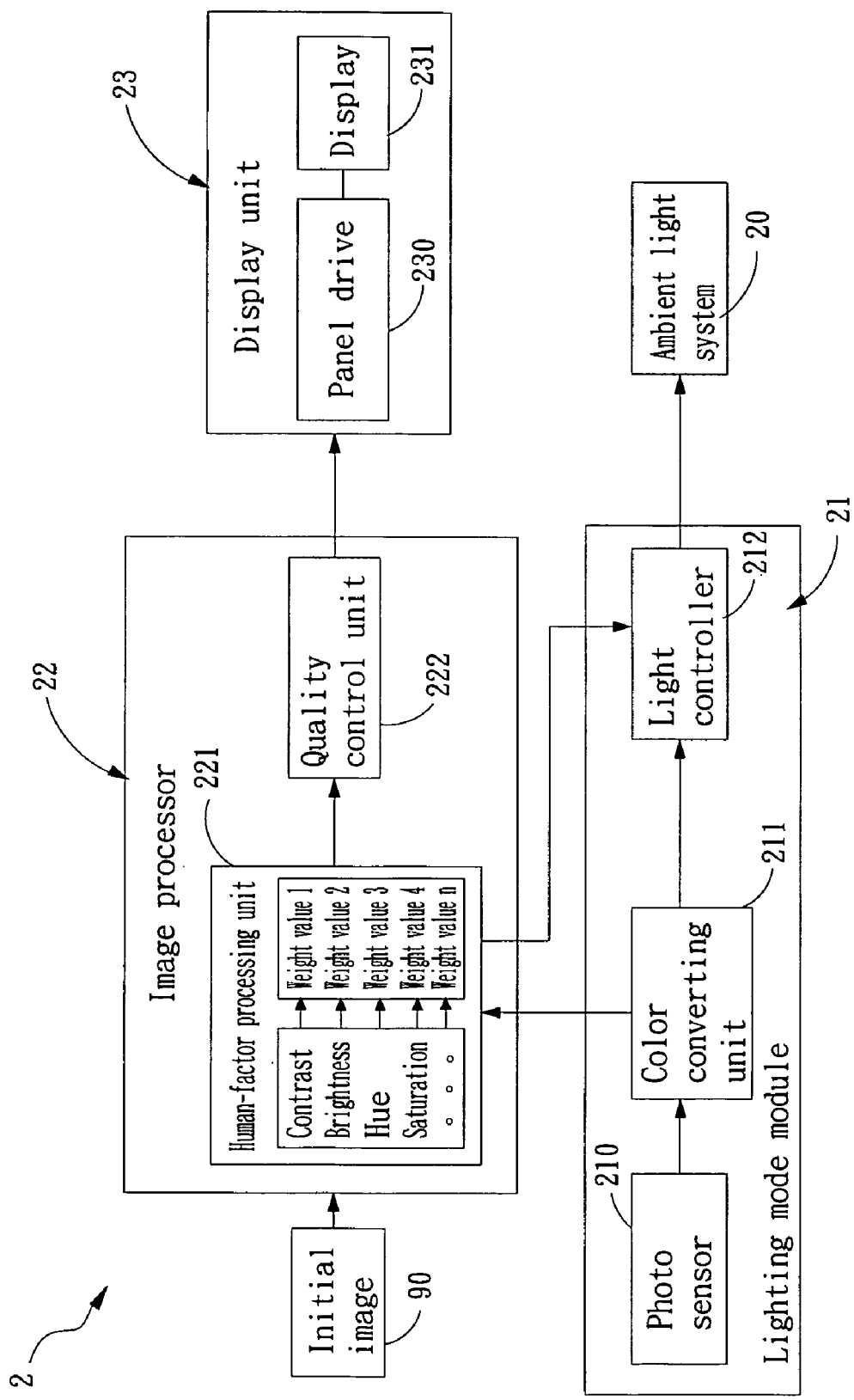
FIG. 4 is a block diagram depicting an image processing and controlling system according to a third exemplary embodiment of the invention.
Figure 5:
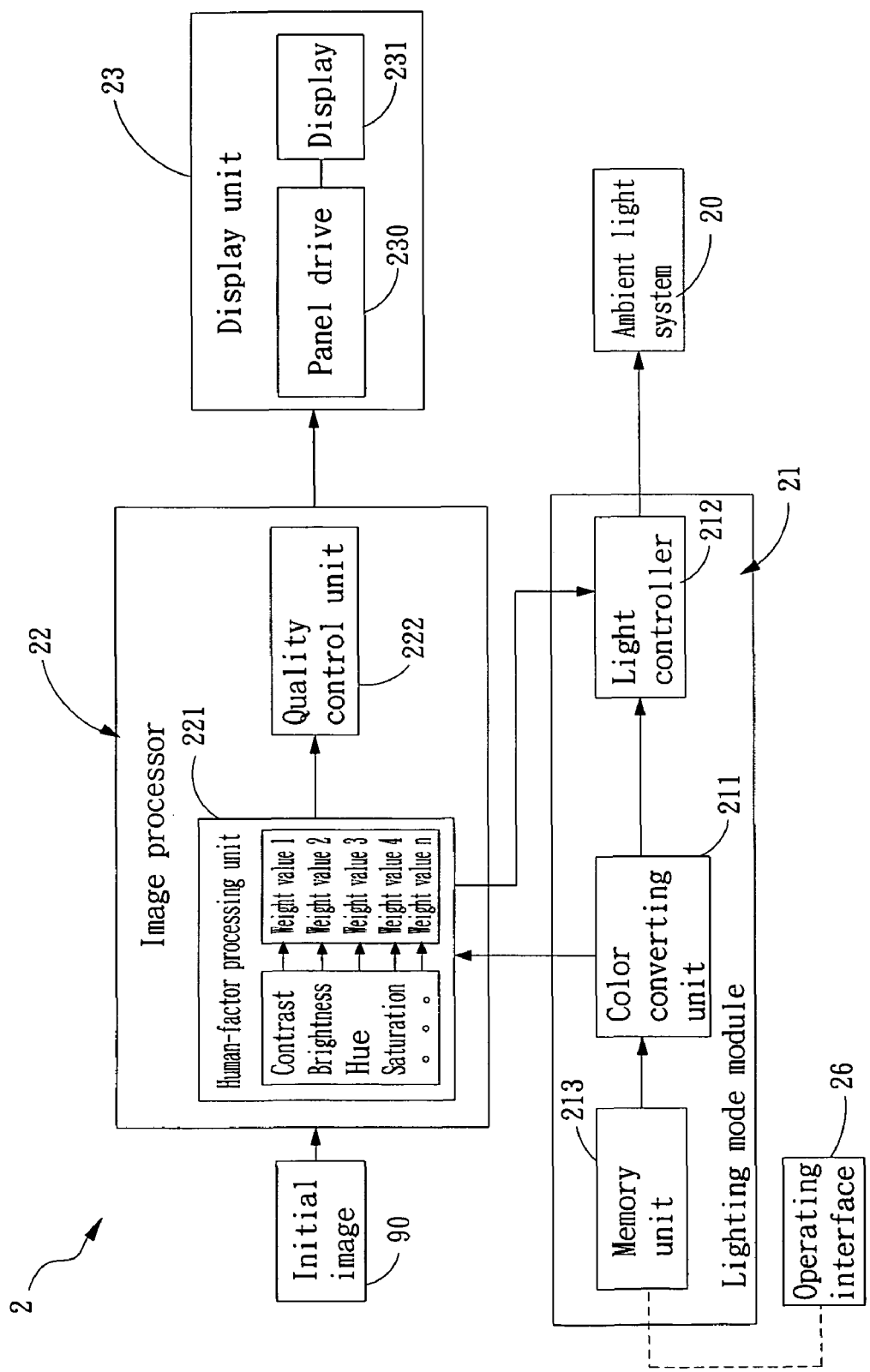
FIG. 5 is a block diagram depicting an image processing and controlling system according to a fourth exemplary embodiment of the invention.

Please refer to FIG. 3, which is a block diagram depicting an image processing and controlling system according to a second exemplary embodiment of the invention. The second embodiment is basically the same as the first embodiment of FIG. 1, but the only difference is that: the photo sensor 210 is replaced by a memory unit 213 that can be a ROM or other accessible memories. In this embodiment, the memory unit 213 is stored with various ambient light data corresponding to different image playing environments to be selected for matching with the scenario playing on the display unit. For instance, while playing a sentimental movie, a sentimental ambient light data is selected with respect to the control of light intensity, brightness and spectrum that is different from the ambient light data suitable for sports. Accordingly, as soon as the initial image is inputted, the lighting mode module 21 is going to select a ambient light data form the memory unit 213 according to the scenario of the initial image for transmitting the selected ambient light data to the color converting unit 211. After the color converting unit receives the ambient light data, it is going to perform the same tasks as those described in FIG. 2 and thus are not described further herein. Moreover, the memory unit is further connected to an operating interface 26, which is provides for enabling a user to manually selected an ambient data from the memory unit 213. Please refer to FIG. 4, which is a block diagram depicting an image processing and controlling system according to a third exemplary embodiment of the invention. The third embodiment is basically the same as the first embodiment of FIG. 1, but the only difference is that: the lighting mode module 21 is further comprises a light controller 212 which is coupled to the color converting unit 211. The light controller 212 is capable of adjusting the light characteristics of the ambient light system 20 according to the lighting signal. As for the light characteristics of the ambient light system 20, it is referring to those parameters relating to illuminance, spectrum, colour, and so on. In addition, the human-factor processing unit 221 is able to generate a light calibration signal to the light controller 212 according to the image characteristics of the output image for enabling the light controller 212 to adjusting the light characteristics of the ambient light system 20 accordingly. Please refer to FIG. 5, which is a block diagram depicting an image processing and controlling system according to a fourth exemplary embodiment of the invention. The fourth embodiment is basically the same as the third embodiment of FIG. 4, but the only difference is that: the photo sensor 210 is replaced by a memory unit 213.

Figure 6:
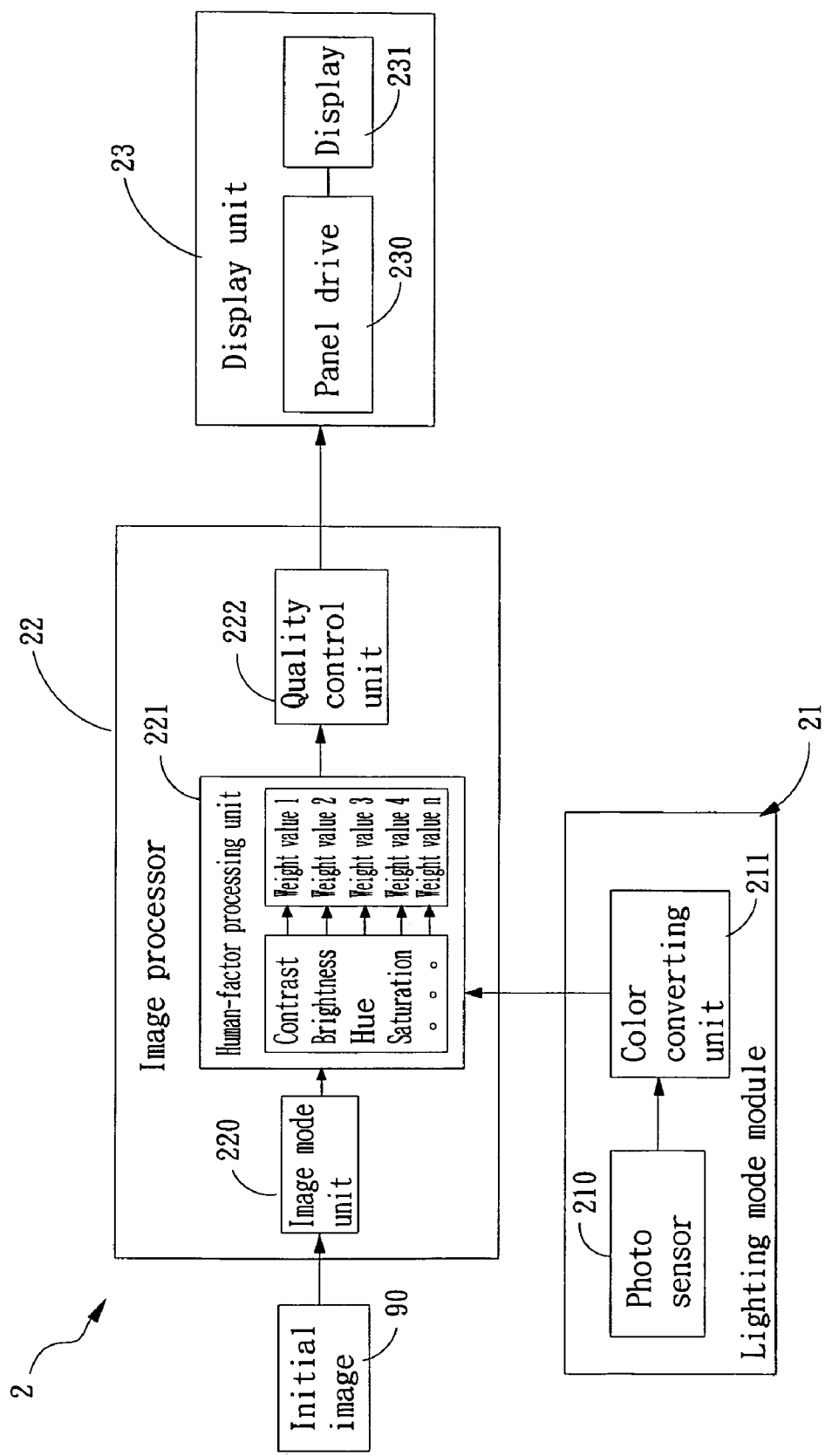
FIG. 6 is a block diagram depicting an image processing and controlling system according to a fifth exemplary embodiment of the invention.

Please refer to FIG. 6, which is a block diagram depicting an image processing and controlling system according to a fifth exemplary embodiment of the invention. The fifth embodiment is basically the same as the first embodiment of FIG. 2, but the only difference is that: the image processor 22 is further comprises an image mode unit 220 that is configured to coupled to the human-factor processing unit 21 in a manner that it can receive the initial image and then perform an image displaying mode switch for presetting an image displaying mode according to a specified human factors. In this embodiment, the image mode unit 220 is equipped with image displaying mode switch function for enabling the same to base upon contents of the initial image or an ergonomic look-up table to adjust the image displaying mode. As consumers of different geographical areas can have difference image preferences since they have different visual attributes or are affected by different physical or mental factors, it is suitable to build various ergonomic look-up tables specifically for different geographical areas, such as America, Europe, Japan, with respect to their different visual preferences in saturation, contrast, hue, etc., so as to establish the foregoing human factors specifically for viewers of different geographical areas. In addition, the image mode unit 220 is also configured with a function for determining the style of the initial image. For instance, it can determine whether the initial image is a sentimental image, a sport image of a nature image, and thus can establish an ergonomic look-up table especially for the image characteristics of that initial image.

Figure 7:
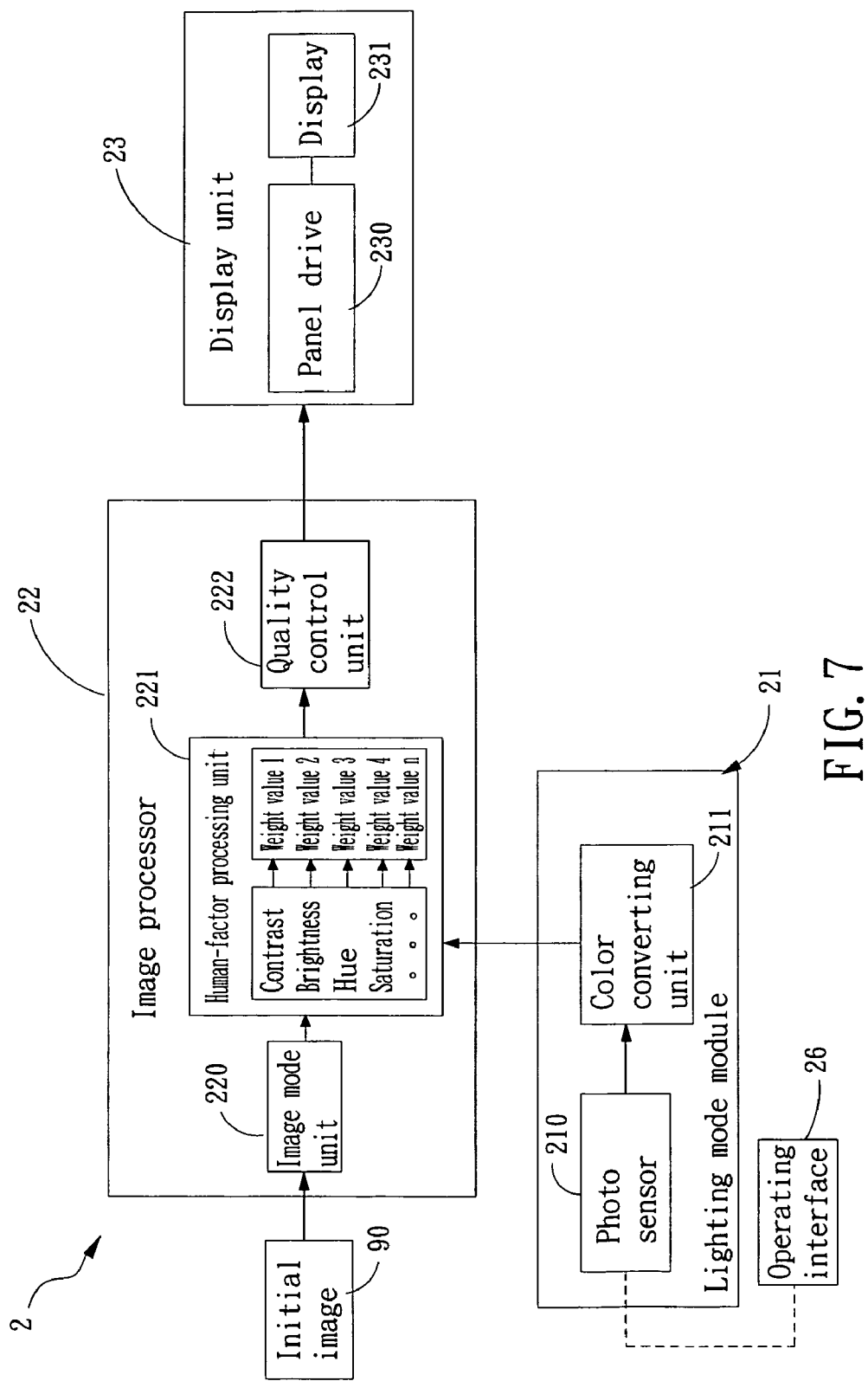
FIG. 7 is a block diagram depicting an image processing and controlling system according to a sixth exemplary embodiment of the invention.
Figure 8:
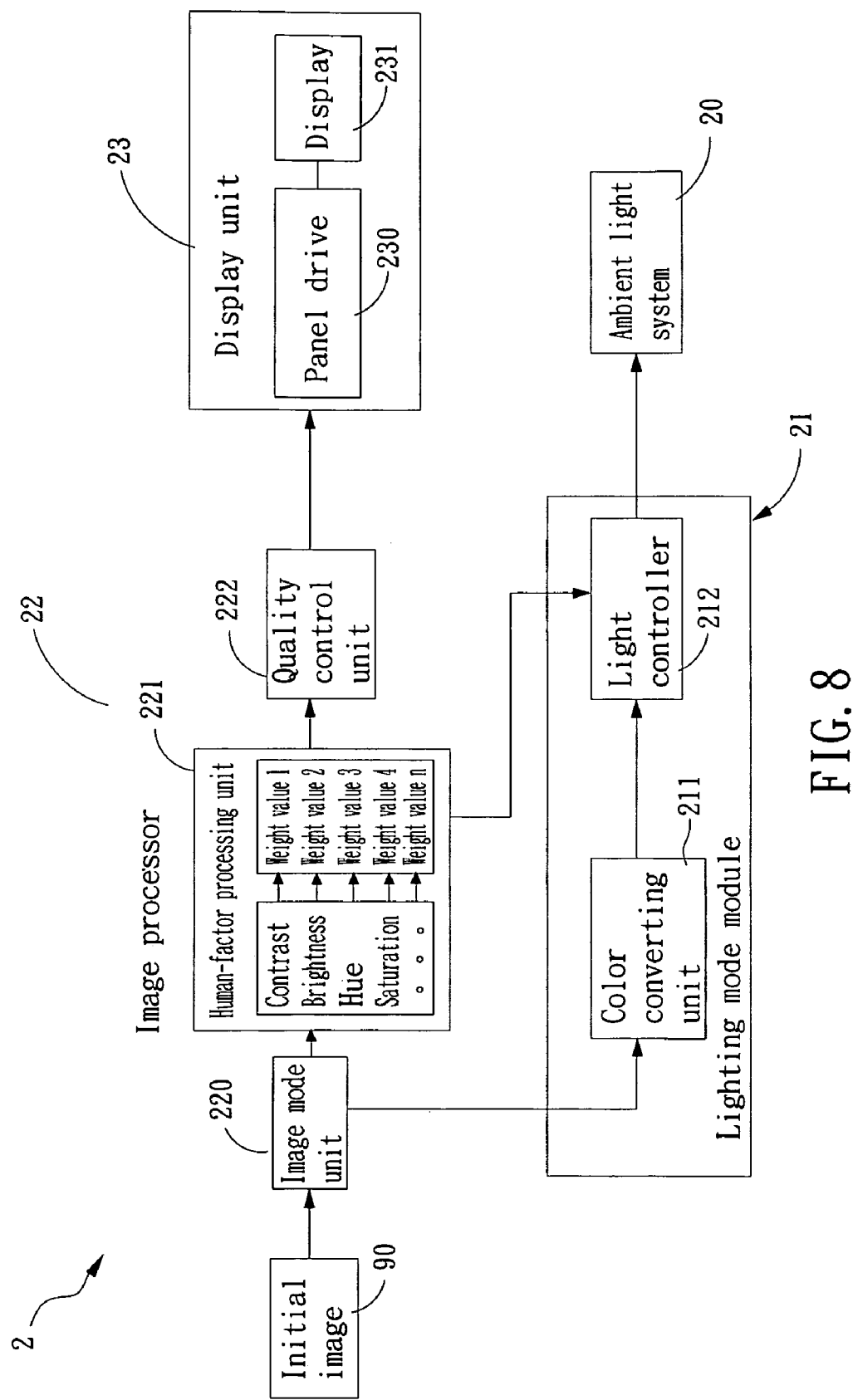
FIG. 8 is a block diagram depicting an image processing and controlling system according to a seventh exemplary embodiment of the invention.
Figure 9:
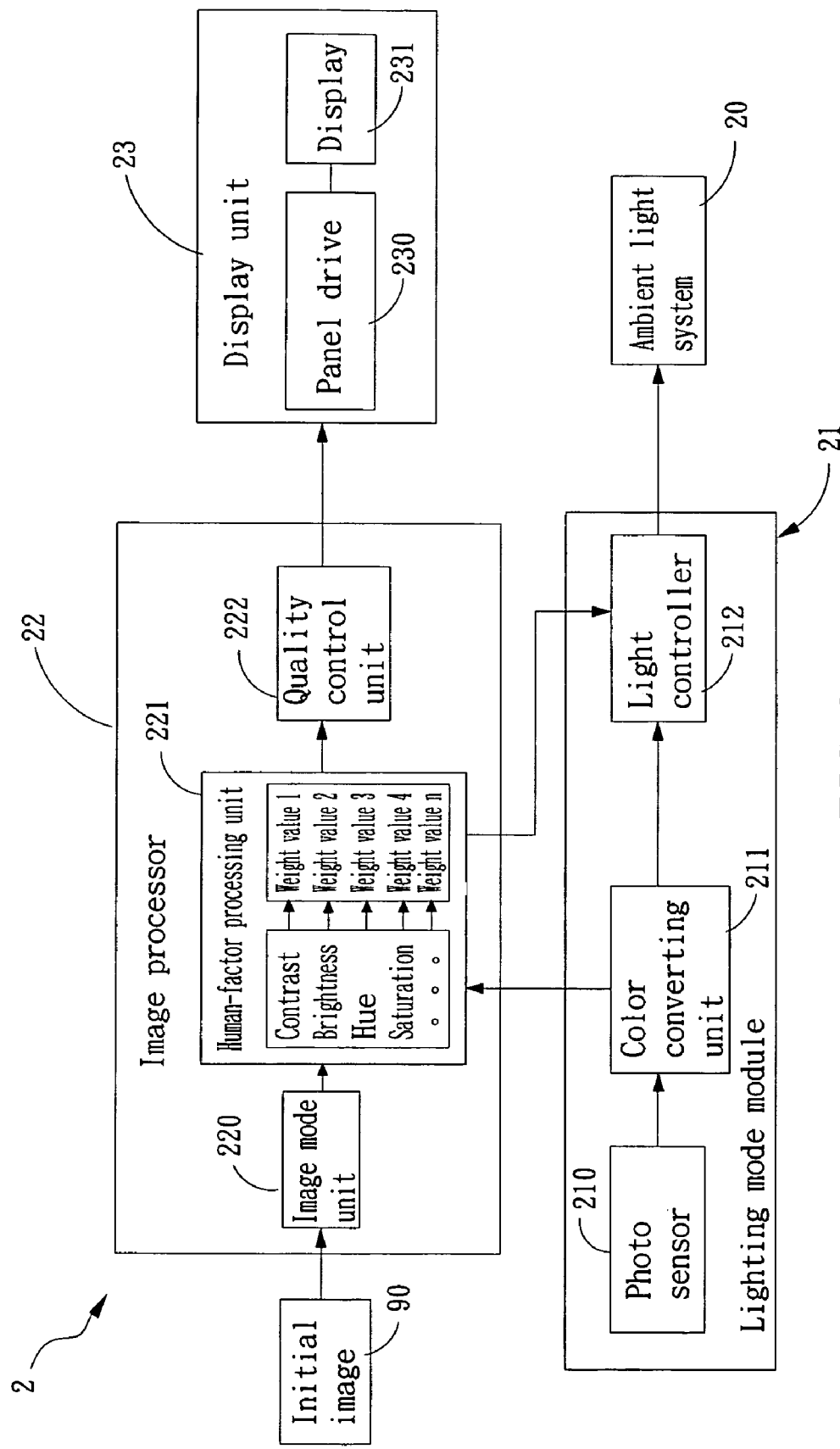
FIG. 9 is a block diagram depicting an image processing and controlling system according to a eighth exemplary embodiment of the invention.
Figure 10:
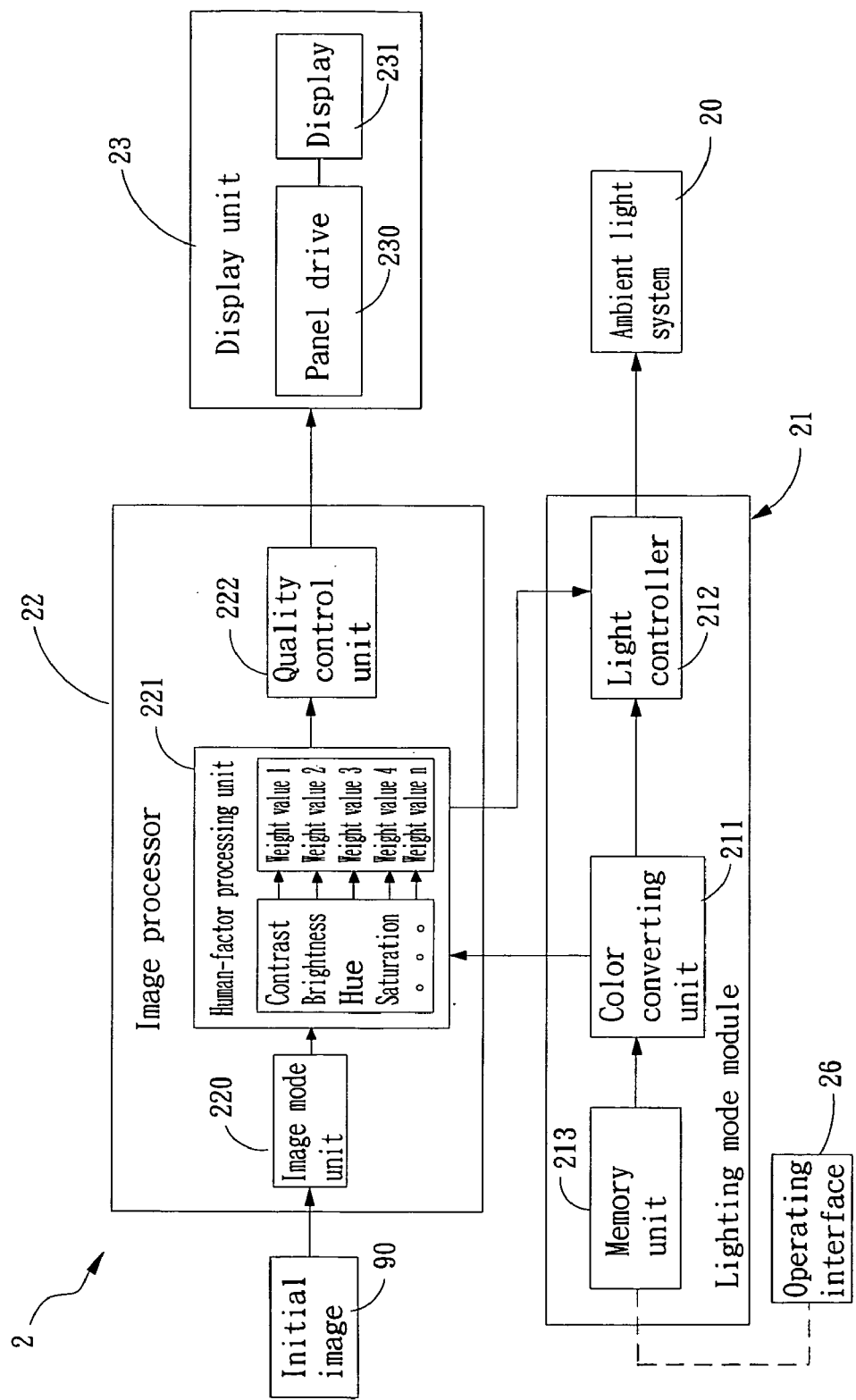
FIG. 10 is a block diagram depicting an image processing and controlling system according to a ninth exemplary embodiment of the invention.

As soon as the image mode unit 220 receives the initial image, it is going to select an image displaying mode according to the scenario of the initial image as well as the specific geographical area, and thereby, the image characteristics of the initial image will be adjusted to match with the selected image displaying mode by the use of the corresponding ergonomic look-up table. Thereafter, the image signal outputted from the image mode unit 220 is transmitted to the human-factor processing unit 221 where it is weighted to form a calibrated image to be send to the quality control unit 222. In the quality control unit 222, the calibrated image is further processed to form an output image to the display unit 23. Please refer to FIG. 7, which is a block diagram depicting an image processing and controlling system according to a sixth exemplary embodiment of the invention. The sixth embodiment is basically the same as the fifth embodiment of FIG. 6, but the only difference is that: the photo sensor 210 is replaced by a memory unit 213 for the purpose similar to the FIG. 3 and thus is not described further herein. Please refer to FIG. 8, which s a block diagram depicting an image processing and controlling system according to a seventh exemplary embodiment of the invention. In this embodiment, the image mode unit 220 can further issue a control signal to the lighting mode module 21 for enabling the color converting unit 211 to control the light controller 212 according to the image displaying mode selected by the image mode unit 220 in a manner that the light controller 212 is directed by the selected displaying mode to control the ambient light system to generate light of light characteristics matching the scenario of the image playing on the display unit 23. Moreover, when the image signal is send to the display unit 23 by the image processor 21, the same time that the human-factor processing unit 221 is transmitting a mode signal to the light controller 212 of the lighting mode module 21 for enabling the same to adjusting the light characteristics of the ambient light system 20 accordingly. Please refer to FIG. 9, which is a block diagram depicting an image processing and controlling system according to a eighth exemplary embodiment of the invention. The eighth embodiment is basically the same as the seventh embodiment of FIG. 8, but the only difference is that: the lighting mode module 21 is further comprises a photo sensor 210. Please refer to FIG. 10, which is a block diagram depicting an image processing and controlling system according to a ninth exemplary embodiment of the invention. The ninth embodiment is basically the same as the seventh embodiment of FIG. 8, but the only difference is that: the lighting mode module 21 is further comprises a memory unit 213.

To sum up, the present invention provides a an image processing and controlling system, capable of adjusting the weighting value with respect to each image characteristic value of an initial image according to lighting characteristics of an ambient light system for enabling a display unit to provide the most comfortable viewing conditions and thus achieve the best image quality for different ambient lighting characteristics.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing and controlling system, comprising:
   an ambient light system for emitting a light toward an ambient environment;
   a lighting mode module, for generating a lighting signal accordingly, comprising:
      a color converting unit, configured to generate the lighting signal; and
      a light controller, connected to the color converting unit and configured for adjusting a lighting characteristic of the ambient light system according to the lighting signal and a light calibration signal;
   an image processor, configured for receiving and processing an initial image signal, comprising:
      a human-factor processing unit, electrically connected to the lighting mode module for obtaining an image characteristics relating to the initial image and then determining a weighting value basing upon the lighting signal for calibrating the image characteristic and thus obtaining a calibrated image characteristic and generating the light calibration signal to the light controller according to the calibrated image characteristics of an output image; and
      a quality control unit, electrically connected to the human-factor processing unit for outputting the output image signal according to the calibrated image characteristic; and
   a display unit, disposed in the ambient environment for receiving the output image signal and thus displaying a corresponding image on the display unit.

2. The image processing and controlling system of claim 1, wherein the human-factor processing unit is enabled to base upon image characteristics of the output image signal to generate a calibrating signal to the lighting mode module.

3. The image processing and controlling system of claim 1, wherein the image characteristic is a parameter selected from the group consisting of: contrast, brightness, hue, saturation and the combinations thereof.

4. The image processing and controlling system of claim 1, wherein the light mode module further comprises:
   a photo sensor, capable of detecting the lighting characteristic of the ambient light system for generating a sensing signal accordingly so that the color converting unit converts the sensing signal into the lighting signal.

5. The image processing and controlling system of claim 1, wherein the light mode module further comprises:
   a memory unit, for storing light modes relating to the control of the ambient light system so that the color converting unit converts a light mode selected from the stored light modes into the lighting signal.

6. The image processing and controlling system of claim 1, wherein the lighting characteristic is a parameter selected from the group consisting of: illuminance, spectrum, colour, color temperature and the combinations thereof.

7. An image processing and controlling system, comprising:
   an ambient light system for emitting a light toward an ambient environment;
   a lighting mode module, for generating a lighting signal accordingly, comprising:
      a color converting unit configured to generate the lighting signal; and
      a light controller, connected to the color converting unit and configured for adjusting a lighting characteristic of the ambient light system according to the lighting signal and a light calibration signal,
   an image processor, configured for receiving and processing an initial image signal, further comprising:
      an image mode unit, for pre-setting an output mode for the initial image signal according to an ergonomic human factor;
      a human-factor processing unit, electrically connected to the image mode unit and the lighting mode module for obtaining an image characteristics relating to the initial image and then determining a weighting value basing upon the lighting signal for calibrating the image characteristic and thus obtaining a calibrated image characteristic and generating the light calibration signal to the light controller according to the calibrated image characteristics of an output image; and
      a quality control unit, electrically connected to the human-factor processing unit for outputting the output image signal according to the calibrated image characteristic; and
   a display unit, disposed in the ambient environment for receiving the output image signal and thus displaying a corresponding image on the display unit.

8. The image processing and controlling system of claim 7, wherein the human-factor processing unit is enabled to base upon image characteristics of the output image signal to generate a calibrating signal to the lighting mode module.

9. The image processing and controlling system of claim 7, wherein the image characteristic is a parameter selected from the group consisting of: contrast, brightness, hue, saturation and the combinations thereof.

10. The image processing and controlling system of claim 7, wherein the color converting unit is further connected to the image mode unit for converting a mode selected by the image mode unit into the lighting signal.

11. The image processing and controlling system of claim 7, wherein the light mode module further comprises:
   a photo sensor, capable of detecting the lighting characteristic of the ambient light system for generating a sensing signal accordingly so that the color converting unit converts the sensing signal into the lighting signal.

12. The image processing and controlling system of claim 7, wherein the light mode module further comprises:
   a memory unit, for storing light modes relating to the control of the ambient light system so that the color converting unit converts a light mode selected from the stored light modes into the lighting signal.

13. The image processing and controlling system of claim 7, wherein the lighting characteristic is a parameter selected from the group consisting of: illuminance, spectrum, colour, color temperature and the combinations thereof.

14. The image processing and controlling system of claim 7, wherein the image mode unit is enabled to output a mode signal to the lighting mode module.

* * * * *